(12) United States Patent
Lemieux et al.

(10) Patent No.: US 10,677,652 B2
(45) Date of Patent: Jun. 9, 2020

(54) APPARATUS AND METHOD FOR CALIBRATING MEASURING INSTRUMENTS

(71) Applicants: University of Ottawa, Ottawa, Ontario (CA); Max-Planck-Gesellschaft zur Forderung der Wissenschaften E.V., Munich (DE); Friedrich-Alexander-Universitaet Erlangen-Nuernberg, Erlangen (DE)

(72) Inventors: Samuel Lemieux, Ottawa (CA); Mathieu Manceau, Erlangen (DE); Robert W. Boyd, Rochester, NY (US); Gerd Leuchs, Erlangen (DE); Maria V. Chekhova, Erlangen (DE)

(73) Assignees: University of Ottawa, Ottawa (CA); Max-Planck-Gesellschaft Zur Forderung Der Wissenschaften E.V., Munich (DE); Friedrich-Alexander-Universitaet Erlangen-Nuernberg, Erlangen (DE)

( * ) Notice: Subject to any disclaimer, the term of this patent is extended or adjusted under 35 U.S.C. 154(b) by 0 days.

(21) Appl. No.: 16/334,944

(22) PCT Filed: Oct. 17, 2017

(86) PCT No.: PCT/IB2017/056450
§ 371 (c)(1),
(2) Date: Mar. 20, 2019

(87) PCT Pub. No.: WO2018/073749
PCT Pub. Date: Apr. 26, 2018

(65) Prior Publication Data
US 2019/0339126 A1    Nov. 7, 2019

Related U.S. Application Data

(60) Provisional application No. 62/408,900, filed on Oct. 17, 2016.

(51) Int. Cl.
*G01J 3/00* (2006.01)
*G01J 3/02* (2006.01)
(Continued)

(52) U.S. Cl.
CPC ............. *G01J 3/0297* (2013.01); *G01J 3/021* (2013.01); *G01J 3/0208* (2013.01);
(Continued)

(58) Field of Classification Search
CPC ........ G01J 3/0297; G01J 3/0208; G01J 3/021; G01J 3/0224; G01J 3/0237; G01J 3/10;
(Continued)

(56) References Cited

U.S. PATENT DOCUMENTS 5,689,110 A    11/1997  Dietz et al.
6,900,756 B2    5/2005  Salmon
(Continued)

FOREIGN PATENT DOCUMENTS

CN    106092337 A    11/2016
WO    01/01184 A1    1/2001

OTHER PUBLICATIONS

International Search Report and Written Opinion received in PCT/IB2017/056450 dated Feb. 15, 2018.

*Primary Examiner* — Tarifur R Chowdhury
*Assistant Examiner* — Jonathon Cook
(74) *Attorney, Agent, or Firm* — Ajay A. Jagtiani; Miles & Stockbridge P.C.

(57) ABSTRACT

A method and apparatus is provided for implementing a parametric down-conversion (PDC)-based calibration comprising calibrating a measuring instrument; disposing a pinhole at a position of a light-emitting sample for which the measuring instrument needs to be calibrated; irradiating a nonlinear crystal with a light source; setting the nonlinear crystal by ensuring a phase-matching wavelength of the
(Continued)

nonlinear crystal is set at one boundary of a desired bandwidth; acquiring one or more PDC spectrums by the measuring instrument; obtaining peak values and their corresponding wavelengths from each acquired spectrum; and obtaining a response function based on the peak values and corresponding wavelengths.

29 Claims, 5 Drawing Sheets

(51) Int. Cl.
  *G01J 3/10*  (2006.01)
  *G01J 3/18*  (2006.01)
  *G01J 3/28*  (2006.01)
  *G01N 21/27*  (2006.01)
  *G01J 3/12*  (2006.01)

(52) U.S. Cl.
  CPC ........... *G01J 3/0224* (2013.01); *G01J 3/0237* (2013.01); *G01J 3/10* (2013.01); *G01J 3/18* (2013.01); *G01J 3/2803* (2013.01); *G01N 21/274* (2013.01); *G01J 2003/1204* (2013.01); *G01J 2003/1291* (2013.01); *G01J 2003/1861* (2013.01); *G01J 2003/282* (2013.01)

(58) Field of Classification Search
  CPC .... G01J 3/18; G01J 3/2803; G01J 2003/1204; G01J 2003/1291; G01J 2003/1861; G01J 2003/282; G01N 21/274
  USPC .......................................................... 356/300
  See application file for complete search history.

(56) References Cited

U.S. PATENT DOCUMENTS

| | | | |
|---|---|---|---|
| 7,365,328 | B2 | 4/2008 | Busch et al. |
| 9,001,968 | B2 | 4/2015 | Kugland et al. |
| 2016/0041032 | A1* | 2/2016 | Matthews ............ G01J 3/0205 356/402 |

* cited by examiner

APPARATUS AND METHOD FOR CALIBRATING MEASURING INSTRUMENTS

CROSS-REFERENCE TO RELATED APPLICATIONS

This application claims benefit of priority of U.S. patent application Ser. No. 16/408,900, entitled, "APPARATUS AND METHOD FOR CALIBRATING THE SPECTRAL SENSITIVITY OF A SPECTROMETER USING PARAMETRIC DOWN-CONVERSION" filed Oct. 17, 2016. The entire content and disclosure of this patent application is incorporated herein by reference in its entirety.

FIELD OF THE INVENTION

The present disclosure relates generally to the measurement of spectral sensitivity of measuring instruments. More particularly, disclosed embodiments relate to calibrating the response function of spectrometer or spectrophotometer devices.

BACKGROUND OF THE INVENTION

Accurate and consistent calibration of conventional measuring instruments is often time consuming, cost intensive and/or unreliable.

Thus, there is a need for producing proper and regular calibration of measuring devices in order to obtain reliable data and results.

SUMMARY

According to a first broad aspect, the present invention provides an apparatus for implementing a parametric down-conversion (PDC)-based calibration comprising a light source; a nonlinear crystal irradiated by the light source; an optical component in line with the nonlinear crystal for suppressing the light source and collecting down-converted light from the nonlinear crystal; a collimating optical component for receiving the down-converted light from the nonlinear crystal; a polarizing beam splitter (PBS) for adjusting the polarization of the down-converted light; and a regulator for adjusting an angular width of the radiation of the down-converted light.

According to a second broad aspect, the present invention provides a system for calibrating a measuring instrument comprising a light source; a nonlinear crystal irradiated by the light source; an optical component in line with the nonlinear crystal for suppressing the light source and collecting down-converted light from the nonlinear crystal; a collimating optical component for receiving the down-converted light from the nonlinear crystal; a polarizing beam splitter (PBS) for adjusting the polarization of the down-converted light; a regulator for adjusting an angular width of the radiation of the down-converted light; and an optical system for imaging the radiation from the regulator to the measuring instrument.

According to a third broad aspect, the present invention provides a method for implementing a parametric down-conversion (PDC)-based calibration comprising calibrating a measuring instrument; disposing a pinhole at a position of a light-emitting sample for which the measuring instrument needs to be calibrated; irradiating a nonlinear crystal with a light source; setting the nonlinear crystal by ensuring a phase-matching wavelength of the nonlinear crystal is set at one boundary of a desired bandwidth; acquiring one or more PDC spectrums by the measuring instrument; obtaining peak values and their corresponding wavelengths from each acquired spectrum; and obtaining a response function based on the peak values and corresponding wavelengths.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION OF THE INVENTION

Definitions

Figure 1:
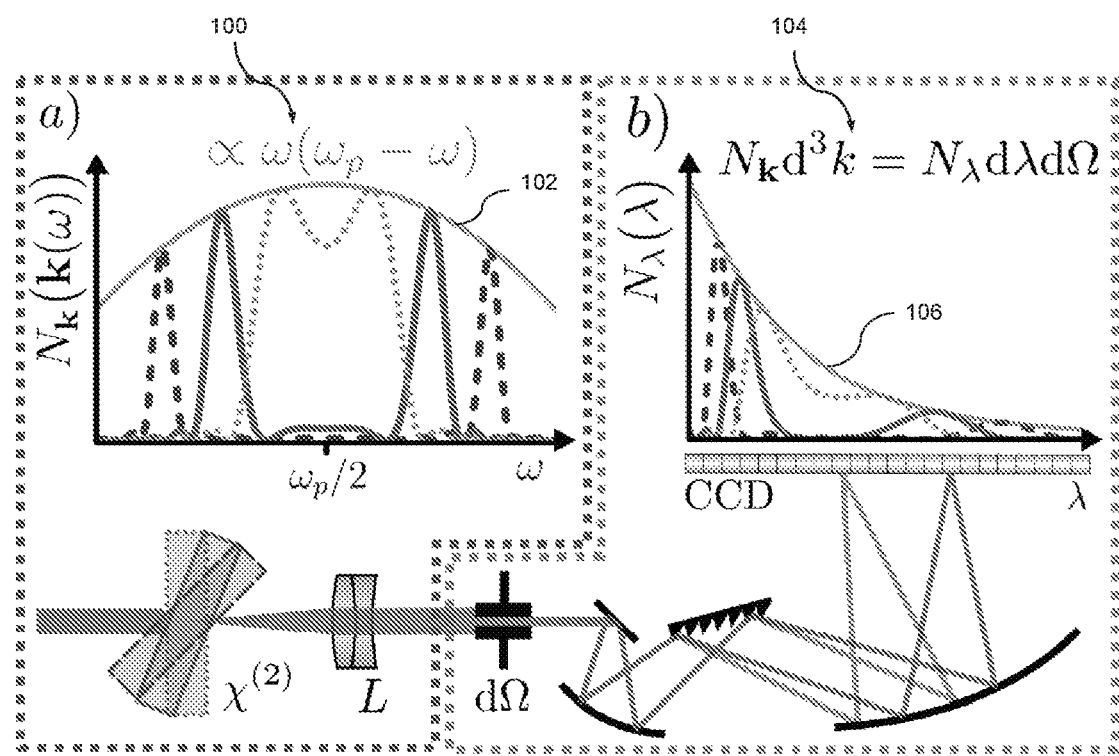
FIG. 1 is a schematic illustration showing the experimental implementation of a methodology using a source of light of known spectrum based on the parametric down-conversion (PDC) process, according to one embodiment of the present disclosure.

Where the definition of terms departs from the commonly used meaning of the term, applicant intends to utilize the definitions provided below, unless specifically indicated.

It is to be understood that the foregoing general description and the following detailed description are exemplary and explanatory only and are not restrictive of any subject matter claimed. In this application, the use of the singular includes the plural unless specifically stated otherwise. It must be noted that, as used in the specification and the appended claims, the singular forms "a," "an" and "the" include plural referents unless the context clearly dictates otherwise. In this application, the use of "or" means "and/or" unless stated otherwise. Furthermore, use of the term "including" as well as other forms, such as "include", "includes." and "included," is not limiting.

For purposes of the present disclosure, the term "comprising", the term "having", the term "including," and variations of these words are intended to be open-ended and mean that there may be additional elements other than the listed elements.

For purposes of the present disclosure, directional terms such as "top," "bottom," "upper," "lower," "above," "below," "left," "right," "horizontal," "vertical," "up," "down." etc., are used merely for convenience in describing the various embodiments of the present disclosure. The embodiments of the present disclosure may be oriented in various ways. For example, the diagrams, apparatuses, etc., shown in the drawing figures may be flipped over, rotated by 90° in any direction, reversed, etc.

For purposes of the present disclosure, a value or property is "based" on a particular value, property, the satisfaction of a condition, or other factor, if that value is derived by performing a mathematical calculation or logical decision using that value, property or other factor.

For purposes of the present disclosure, it should be noted that to provide a more concise description, some of the quantitative expressions given herein are not qualified with the term "about." It is understood that whether the term "about" is used explicitly or not, every quantity given herein is meant to refer to the actual given value, and it is also meant to refer to the approximation to such given value that would reasonably be inferred based on the ordinary skill in the art, including approximations due to the experimental and/or measurement conditions for such given value.

For purposes of the present disclosure, the term "calibration" refers to measurement technology and/or metrology as the comparison of measurement values delivered by a device under test with those of a calibration standard of known accuracy. Such a standard could be another measurement device of known accuracy, a device generating the quantity to be measured, or a physical artifact. The outcome of the comparison can result in no significant error being noted on the device under test, a significant error being noted but no adjustment made, or an adjustment made to correct the error to an acceptable level. The term calibration may mean the act of comparison and does not necessary include any subsequent adjustment. The calibration standard may normally be traceable to a national standard held by a National Metrological Institute. By formal definition, calibration may be regarded by the International Bureau of Weights and Measures (BIPM) as an operation that, under specified conditions, in a first step, establishes a relation between the quantity values with measurement uncertainties provided by measurement standards and corresponding indications with associated measurement uncertainties (of the calibrated instrument or secondary standard) and, in a second step, uses this information to establish a relation for obtaining a measurement result from an indication. Thus, the calibration process may be purely a comparison, but introduce the concept of measurement uncertainty in relating the accuracies of the device under test and the standard.

For purposes of the present disclosure, the term "charge-coupled device" (CCD) refers to a device for the movement of electrical charge, usually from within the device to an area where the charge can be manipulated, for example conversion into a digital value. This is achieved by "shifting" the signals between stages within the device one at a time.

For purposes of the present disclosure, the term "dichroic filter" refers to an optical color filter operating on the principle of wave interference between closely spaced reflecting surfaces, rather than by color absorption. Also referred to as thin-film filters, or interference filters, dichroic filters are very accurate color filters used to selectively pass light of a small range of colors while reflecting other colors. By comparison, dichroic mirrors and dichroic reflectors tend to be characterized by the color(s) of light that they reflect, rather than the color(s) they pass. Dichroic filters can filter light from a white light source to produce light that is perceived by humans to be highly saturated (intense) in color.

For purposes of the present disclosure, the term "dichroic material" refers to a material which causes visible light to be split up into distinct beams of different wavelengths (colors) (not to be confused with dispersion), or one in which light rays having different polarizations are absorbed by different amounts.

For purposes of the present disclosure, the term "dichroic mirror" refers to an optical color filter covered with special metal film which reflects certain colors of light and lets others to pass through. Dichroic mirrors offer significantly different reflection or transmission properties at two different wavelengths. In a dichroic mirror or filter, instead of using an oil film to produce the interference, alternating layers of optical coatings with different refractive indices are built up upon a glass substrate. The interfaces between the layers of different refractive index produce phased reflections, selectively reinforcing certain wavelengths of light and interfering with other wavelengths. The layers are usually added by vacuum deposition. By controlling the thickness and number of the layers, the frequency (wavelength) of the passband of the filter can be tuned and made as wide or narrow as desired. Because unwanted wavelengths are reflected rather than absorbed, dichroic filters do not absorb this unwanted energy during operation and so do not become nearly as hot as the equivalent conventional filter. Where white light is being deliberately separated into various color bands (for example, within a color video projector or color television camera), the similar dichroic prism is used instead. For cameras, however it is maybe more common to have an absorption filter array to filter individual pixels on a single CCD array. Arranged with a diode-pumped laser, a dichroic mirror may be configured next to a laser nonlinear crystal in order for injecting pump light.

For purposes of the present disclosure, the term "electromagnetic spectrum" refers to the full range of all frequencies of electromagnetic radiation and also to the characteristic distribution of electromagnetic radiation emitted or absorbed by that particular object. Generally, electromagnetic radiation is classified by wavelength into radio wave, microwave, terahertz (or sub-millimeter) radiation, infrared, the visible region that is perceived as light, ultraviolet, X-rays and gamma rays. The behavior of EM radiation depends on its wavelength. Thus, electromagnetic spectrum is the entire range and scope (spectrum) of frequencies of electromagnetic radiation and their respective wavelengths and photon energies. Devices used to measure an electromagnetic spectrum may include a spectrograph or spectrometer. The visible spectrum is the part of the electromagnetic spectrum that can be seen by the human eye. The wavelength of visible light ranges from 390 to 700 nm. The absorption spectrum of a chemical element or chemical compound is the spectrum of frequencies or wavelengths after its interaction with the incident radiation. The emission spectrum refers to the spectrum of radiation emitted due to an atom or molecule making a transition from a higher to a lower energy state.

For purposes of the present disclosure, the term "electron-multiplying CCD" (EMCCD) refers to a charge-coupled device in which a gain register is placed between the shift register and the output amplifier. The gain register is split up into a large number of stages. In each stage, the electrons are multiplied by impact ionization in a similar way to an avalanche diode. The gain probability at every stage of the register is small ($P<2\%$), but as the number of elements is large ($N>500$), the overall gain can be very high ($g=(1+P)^N$), with single input electrons giving many thousands of output electrons. Reading a signal from a CCD gives a noise background, typically a few electrons. In an EMCCD, this noise is superimposed on many thousands of electrons rather than a single electron; the devices' primary advantage is thus their negligible readout noise.

For purposes of the present disclosure, the term "nonlinear crystal" refers to a type of nonlinear media in which the dielectric polarization P responds nonlinearly to the electric field E of the light. The nonlinearity is typically observed at very high light intensities (values of the electric field comparable to interatomic electric fields, typically $10^8$ V/m) such as those provided by lasers. Various nonlinear optical crystals may include Lithium Triborate (LBO). Beta Barium Borate (BBO). Potassium Titanyl Phosphate (KTP), Potassium Dihydrogen Phosphate & Potassium Dideuterium Phosphate (KDP & DKDP), Lithium Iodate ($LiIO_3$), Lithium Niobate ($LiNbO_3$) and infrared nonlinear optical crystals ($AgGaS_2$, $AgGaSe_2$, GaSe, $ZnGeP_2$) with given standard sizes and orientations are available for fast off-the-shelf delivery. In some cases custom made nonlinear optical crystal may be utilized. In select embodiments, nonlinear crystal may include properties in which its phase-matching wavelengths may be adjusted or changed including, for example, uniaxial crystals. Nonlinear crystals of the disclosed invention may also include crystal types wherein its temperature may be adjusted or changed.

For purposes of the present disclosure, the term "nonlinear optics" (NLO) refers to the branch of optics that describes the behavior of light in nonlinear media, that is, media in which the dielectric polarization P responds nonlinearly to the electric field E of the light. The nonlinearity is typically observed only at very high light intensities (values of the electric field comparable to interatomic electric fields, typically $10^8$ V/m) such as those provided by lasers.

For purposes of the present disclosure, the term "spectra" refers to measurement technology and/or metrology as the comparison of measurement values delivered by a device under test. Plural of spectrum, an array of entities, as light waves or particles, ordered in accordance with the magnitudes of a common physical property, as wavelength or mass: often the band of colors produced when sunlight is passed through a prism, comprising red, orange, yellow, green, blue, indigo, and violet. Spectra may include a band or series of colors together with extensions at the ends that are not visible to the eye, but that can be studied by means of photography, heat effects, etc., and that are produced by the dispersion of radiant energy other than ordinary light rays.

For purposes of the present disclosure, the term "spectrometer" refers to an apparatus used for recording and measuring spectra, especially as a method of analysis. Embodiments may include spectrometers as a scientific instrument used to split light into an array of separate colors, called a spectrum. More generally, spectrometers may be utilized to separate particles, atoms, and molecules by their mass, momentum, or energy.

For purposes of the present disclosure, the term "spectrophotometry" refers to the quantitative measurement of the reflection or transmission properties of a material as a function of wavelength. Use of photometers, known as spectrophotometers, may be employed to measure a light beam's intensity as a function of its color (wavelength). Important features of spectrophotometers may include spectral bandwidth (the range of colors it can transmit through the test sample), the percentage of sample-transmission, the logarithmic range of sample-absorption, and sometimes a percentage of reflectance measurement.

For purposes of the present disclosure, the term "spectrophotometer" refers to a device used for the measurement of transmittance or reflectance of solutions, transparent or opaque solids, such as polished glass, or gases.

DESCRIPTION

While the invention is susceptible to various modifications and alternative forms, specific embodiment thereof has been shown by way of example in the drawings and will be described in detail below. It should be understood, however, that it is not intended to limit the invention to the particular forms disclosed, but on the contrary, the invention is to cover all modifications, equivalents, and alternatives falling within the spirit and the scope of the invention.

Proper and regular calibration of measuring instruments is essential in order to obtain reliable data. Calibration is a critical aspect in scientific instrumentation in order to verify the accuracy of results obtained by a scientific instrument. In general calibrating and/or correcting for the response function of an instrument, such as a spectrometer, requires that the instrument response be tested against a reference source with a known output of brightness vs. wavelength. In disclosed embodiments, wavelength may be considered as equivalent to any other quantity that defines the frequency of a light field, such as the frequency itself or the wavenumber.

Conventionally, the reference source may be considered as any source of broadband light (e.g., light bulb or LEDs) traceable, for instance, to the National Institute of Standards and Technology (NIST) or, alternatively, any source of light whose spectral brightness is known from the principles of physics, such as a black-body radiation (heating a cavity to a very high temperature) of known temperature. However, these two types of sources have limitations. For example, NIST-traceable sources may give reliable output spectrum but only for a limited amount of time due to the degradation of the material. Additionally, recalibrating a source of light to NIST can be time consuming and cost prohibitive. A close-to-perfect black body radiation can be obtained at the output of a cavity and maintained at a constant high temperature, but such devices are typically expensive and hard to operate. Furthermore, only a small portion of the spectrum of practical sources of blackbody radiation lies in the visible range of the electromagnetic spectrum, thereby limiting their capabilities in that range.

The foregoing limitations are addressed, to a great extent, by the present disclosure, wherein in one aspect an apparatus and method are provided to calibrate a spectrometer or other spectral instrument. One method of correcting or appropriately calibrating the response function of the spectrometer using a known reference spectrum is by measuring the spectrum of the reference material or source, and dividing the observed reference spectrum by the known reference output. Therefore a primary attribute of an ideal reference source for correcting/calibrating the response function of a spectrometer is a known spectrum over the relevant wavelength range. Embodiments of the present disclosure are directed to an apparatus and method, for generating parametric down-conversion (PDC) based signals whose brightness at the phase-matched wavelengths describe a known spectrum (phase-matched brightness vs. wavelength curve is independent of experimental parameters) that may be used, among other things, in facilitating intensity calibration of a spectrometer or other spectral instrument.

In order to achieve parametric down-conversions (PDC), a nonlinear crystal is used to split photons from a pump laser into pairs of photons that, in accordance with the laws of conservation of energy and conservation of transverse momentum, have combined energies and transverse momenta equal to the energy and transverse momentum of the original pump photon. The state of the crystal is unchanged by the process. If the photons share the same polarization the process is called "type-I." if they have orthogonal polarizations, the process is called "type-II."

PDC is the production of photon pairs triggered by the zero-point vacuum fluctuations. Depending on the pump power, the brightness of parametric down-conversion can range from very low (spontaneous regime), on the order of $10^{-7}$ photons per mode, requiring single-photon detectors for registration, to up to $10^8$ photons per mode (high-gain regime), high enough to produce a spot visible to the naked eye on a piece of paper. In the spontaneous regime, the PDC brightness grows linearly with the pump power; in the high-gain regime, the PDC brightness grows exponentially with the pump power. There are various ways to vary the frequency spectrum of PDC. Depending on the orientation of the crystal optic axis with respect to the pump wave vector, or on the crystal temperature, the output spectrum looks either like a 'flat top' centered at half of the pump frequency or like two peaks (labeled signal and idler) at frequencies equally displaced to both sides from half of the pump frequency. These cases are called, respectively, frequency degenerate and nondegenerate (two-color). In the spontaneous regime, the peak frequencies and frequency bandwidth of the PDC depend on the length and on the dispersion relation of the nonlinear crystal.

In the disclosed PDC apparatus design, a pulsed laser beam, termed the "pump" beam, is directed at a nonlinear crystal. The pump peak power is such that the type-I PDC is bright enough to be detected by a spectrometer, and low enough to remain in the spontaneous regime. The spectrum is tuned by rotating the nonlinear crystal with respect to the incident pump beam.

Disclosed embodiments of the invention provide a method for generating a frequency tunable beam with the phase-matched brightness independent of laboratory parameters, based on parametric down-conversion. Thus, embodiments of the present disclosure provide a relatively low-cost design for easily and effectively indicating a reference signal for accurate calibration of spectral instruments. Additionally disclosed embodiments provide a method for calibration of a measurement instrument such as, for example, a spectrometer using a reference light generated through parametric down-conversion.

Thus, PDC is utilized to calibrate the sensitivity of the spectral instrument. For example, the PDC brightness at the phase-matched wavelengths of the twin-peaks in nondegenerate PDC are sought to be described by a known function over a broad frequency range around degeneracy. Accordingly, comparing the measured phase-matched brightness curve and the expected curve allows an estimate of the response function of the spectrometer.

In the following, a mathematical description of the photon-number frequency spectrum of two-color PDC that exhibits a parabolic functional dependence around degeneracy along with the enabling implementation methods is presented. The findings are then applied towards experimental demonstration of a calibration method based on the properties of nondegenerate parametric down-conversion.

In the spontaneous regime, the number of photons of frequency $\omega_s$ and $\omega_i$ in the planewave mode $k_s$ is represented in equation (1)[1], $$N_k(k_s(\omega_s))d^3k \propto \left(\frac{\chi^{(2)}|E_p|L}{n(\omega_s)n(\omega_i)}\alpha(q_s, q_i)\right)^2 \omega_s\omega_i d^3k. \quad (1)$$

In equation (1), subscripts p, s and i denote the pump, the signal and the idler beams, $\chi^{(2)}$ is the effective quadratic susceptibility of a nonlinear crystal of length L, $|E_p|$ is the pump electric field amplitude, and $\alpha(q_s, q_i)$ is the phase-matching function. The phase matching function as a function of the longitudinal wave vectors $q_s$, $q_i$ and $q_p$ and of the length L of the nonlinear crystal is expressed in equation (2).

$$\alpha(q_s, q_i) = \frac{\sin([q_p - q_s - q_i]L/2)}{[q_p - q_s - q_i]L/2} \quad (2)$$

Here, the pump is assumed to be a monochromatic plane wave. Also, the photon energy conservation dictates $\omega_p = \omega_s + \omega_i$. The photon-number density in the wavelength space $N_\lambda(\lambda)$ can be obtained by using the relation $N_k d^3k = N_\lambda d\lambda d\Omega$, where $\Omega$ is the solid angle. If, furthermore, the phase-matching condition $q_p - q_s - q_i = 0$ is fulfilled, the phase-matching function reads $\alpha(q_s, q_i) = 1$. Finally, assuming that $\chi^{(2)}/[n(\omega_s)n(\omega_i)]$ is a function that varies slowly with the wavelength, the number of phase-matched signal photons hitting a detector spanning a small solid angle $d\Omega$ and a small bandwidth $d\lambda$ follows the functional dependence given by equation (3). This equation does not depend on laboratory parameters; rather, it is determined completely by the wavelength of the pump laser.

$$N_\lambda(\lambda_s) \propto \frac{1}{\lambda_s^5}\left(\frac{1}{\lambda_p} - \frac{1}{\lambda_s}\right) \quad (3)$$

FIG. 1 illustrates the conceptual relationship between the equations above and the measurement apparatus of the disclosed invention. Graph 100 of FIG. 1a shows several PDC photon-number spectral densities of plane waves in the frequency space, at one fixed polar angle of the radiation, and for different angles of the optic axis of a nonlinear crystal, as per equation (1). Curve 102 links all phase-matched spectral densities.

Graph 104 of FIG. 1b shows the same spectra of photon-number spectral density in a space that takes into account spatial filtering. In one disclosed configuration, a small pinhole may be utilized in the disclosed exemplary system for implementing a PDC-based calibration methodology as further detailed below. According to one embodiment, the small pinhole may be utilized to produce a measurement of an exemplary optical spectrometer. Graph 104 shows the same spectral densities as detected, for example, by the aforementioned pinhole and spectrometer, with the curve 106 linking the phase-matched spectral densities, given by equation (3). Thus, in one disclosed configuration, the pinhole is configured to select a small angular width $d\Omega$ wherein the spectrometer disperses the spectral components such that the detectors effectively register photons in a mode of size $d\lambda d\Omega$. Hence, the photon-number spectral density detected by the spectrometer is simply obtained by applying the relation $N_k d^3k = N_\lambda d\lambda d\Omega$ to equation (1).

Figure 2:
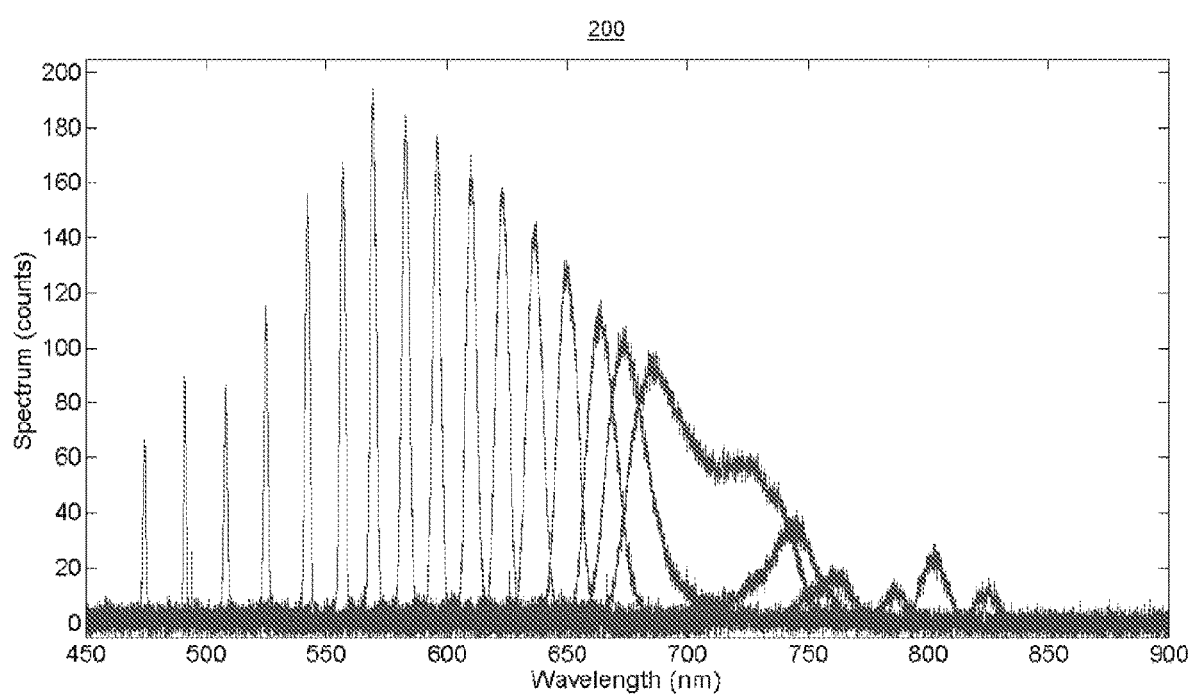
FIG. 2 illustrates a series of PDC spectra for different crystal phase-matching conditions measured with an uncalibrated spectrometer, according to one embodiment of the present disclosure.

Graph 200 of FIG. 2 shows uncalibrated measurements of two-color spectra of PDC at various angles between the optic axis of a nonlinear crystal and the pump wavevector using a spectrometer with unknown sensitivity.

Figure 3:
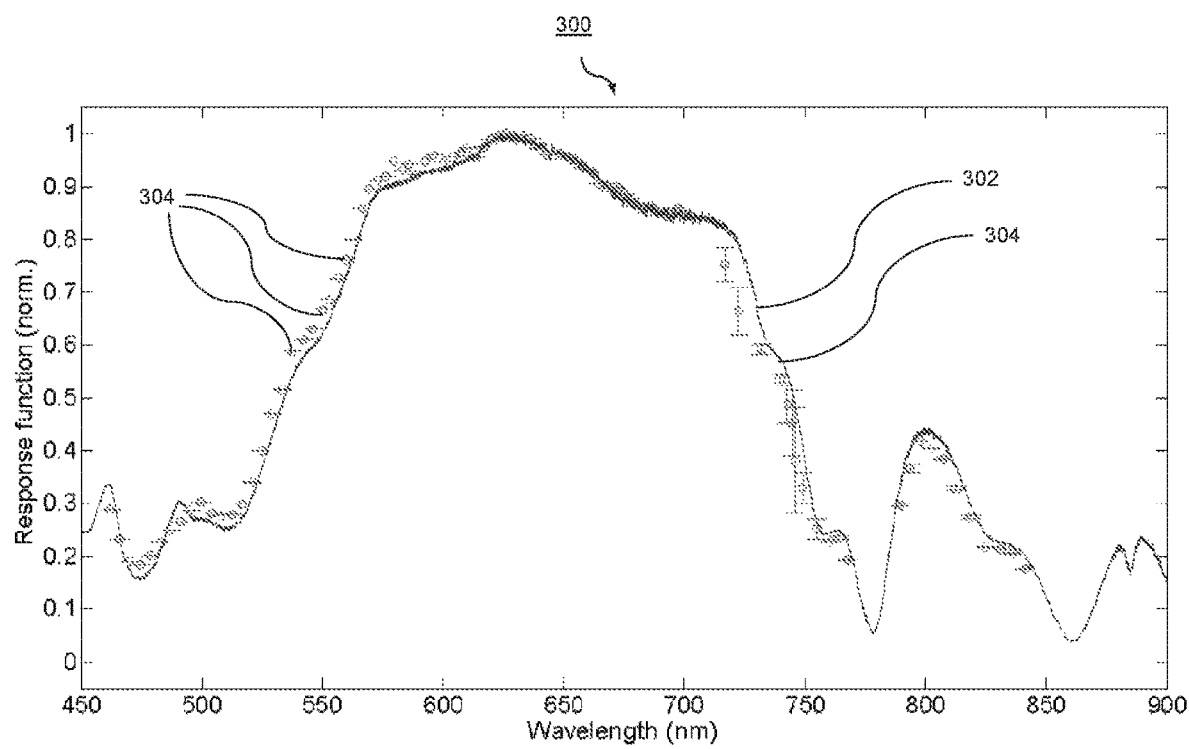
FIG. 3 is a graph showing the instrument response function of the spectrometer, including the transmission function of all optical components after the nonlinear crystal, according to one embodiment of the present disclosure.

FIG. 3 shows the instrument response function of the spectrometer, including the transmission function of all optical components disposed, for example, after a position of the nonlinear crystal in the exemplary configuration.

Graph 300 illustrates the comparison between the relative sensitivity (also referred to as the relative instrument response function) of an optical spectrometer measured, for example, with a NIST-traceable lamp of a known spectral shape (e.g., curve 302), and measured using an experimental implementation of a PDC-based calibration methodology using a source of light based on the PDC process (e.g., data points 304), according to one embodiment of the present disclosure.

Thus, the response function may be defined as the ratio between a measured spectrum and an expected spectrum. In accordance with the disclosed embodiment, data points 304 correspond to the response function obtained by using the maxima of the functions in FIG. 2 divided by the functional dependence in equation (3). Error bars are estimated from the mismatch between the phase-matched wavelengths and the wavelengths of the peaks. Curve 302 is the response function obtained with the NIST-traceable lamp of known spectrum introduced at the position of the nonlinear crystal.

In accordance with one aspect of the present disclosure, the light source of known spectrum may be provided as a reference signal to an arbitrary spectral instrument to enable wavelength calibration of the arbitrary spectral instrument based on a comparison of the spectral instrument output with the reference signal.

Figure 4:
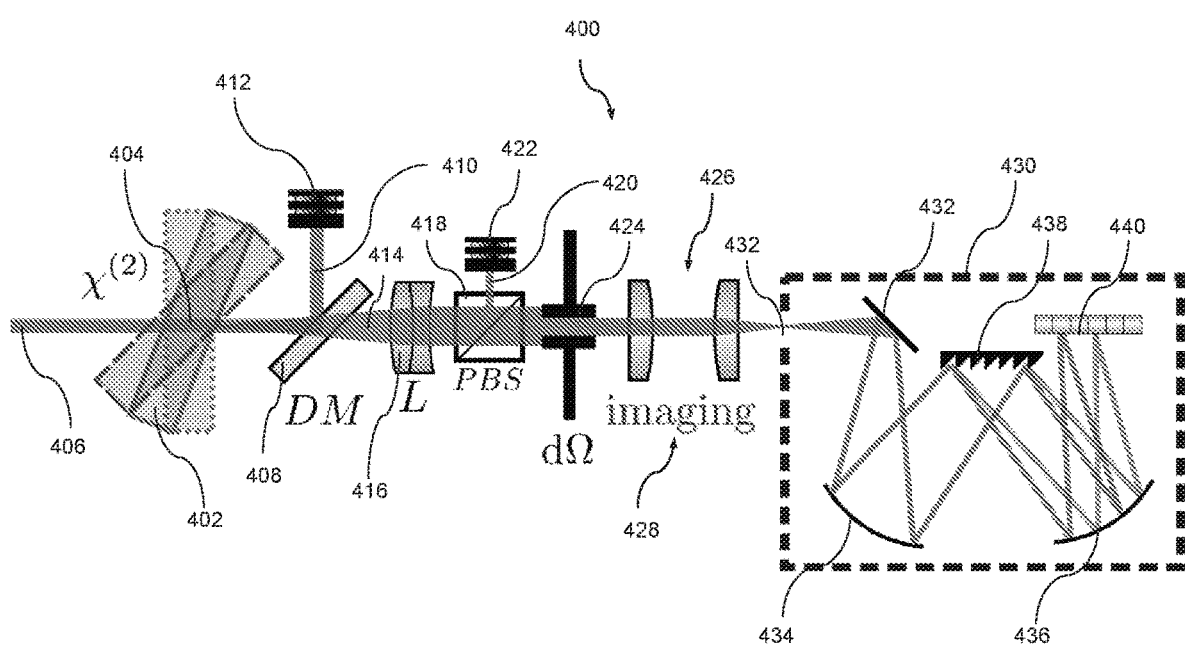
FIG. 4 illustrates an exemplary system for implementing a PDC-based calibration methodology, according to one embodiment of the present disclosure.

FIG. 4 illustrates an exemplary system 400 for implementing a PDC-based calibration methodology. System 400 may include a light source that relies on the properties of two-color PDC. The disclosed source may comprise a nonlinear crystal 402. In an exemplary embodiment, nonlinear crystal 402 may be adjustable or configured to alter the phase-matching condition of the crystal. Thus, in one disclosed embodiment nonlinear crystal 402 is disposed on a rotating mount 404. Nonlinear crystal 402 may be irradiated by a pump laser 406 (which can, in principle, be any intense pulsed laser). The disclosed source further comprises an optical component, such as a dichroic mirror (DM) 408, that may be adjusted to reflect a prescribed pump laser wavelength 410 such as to a beam dump 412. Dichroic mirror 408 transmits the down-converted light 414 to a collimating optical component (L) 416 with low chromatic aberration, such as a concave mirror or an achromatic lens, to bring the PDC light to the far field. In general, the instrument response function depends on the polarization of the light in the system. A polarizing beam splitter (PBS) 418 is employed to ensure that the (unpolarized) NIST-traceable lamp (304 in FIG. 3) and the PDC possess the same polarization. To obtain the response function for two orthogonal polarizations, a half-wave plate on a rotation mount could be introduced before the PBS. Extraneous light 420 may be issued to beam dump 422. A regulator for adjusting the angular width of the radiation may be utilized to refine the down-converted light. Select embodiments utilize a small pinhole 424 to select a small angular width of the radiation. Pinhole 424 is placed in the focal plane of collimating optical component 416.

An entrance optic 426, such as an optical system 428, images pinhole 424 onto the entrance aperture of measuring instrument 430 such as a spectrometer or a spectrophotometer. The optical system could be an optical component (such as a lens or a mirror) or a set of optical components that satisfy the conditions for imaging with the pinhole 424 as the object and the entrance aperture of measuring instrument 430 as the image plane; and that match the f-number (or focal ratio) of measuring instrument 430. As an alternative to imaging, the pinhole could be placed directly at the position of, for example, the entrance slit 432. Once optical system 428 images pinhole 424 on, for example, the entrance slit 432 of measuring instrument 430, the light is spectrally separated by the optical components of measuring instrument 430. (The aforementioned optical components may include, but not limited to, mirror 432, concave mirrors 434, 436, dispersing element (e.g., prism or grating) 438, array of detectors (e.g., one or two-dimensional camera (e.g., typically CCD)) 440, etc. The array of detectors can be replaced with an exit slit in the case of a monochromator.) At this point, the light may be processed and detected, for instance, by an array of detectors, or sent through an output slit to be detected by another type of detector (not shown).

The instrument response function shown in FIG. 3 takes into account the transmission function of all the optics after nonlinear crystal 402. To extract the response function of measuring instrument 430 without the optics behind it, it is desirable to simply measure the transmission function of the undesired optical components and remove their contribution from the measured response function.

It is assumed that, upon rotating nonlinear crystal 402, the effect of the oblique incidence of the pump on the surfaces of nonlinear crystal 402, as well as the effect of added crystal thickness, are negligible, since the angle of incidence remains very small (<5°) for most nonlinear crystals. These effects could be accounted for by using the dispersion curves of the nonlinear crystal and by keeping track of the angle. Likewise, the nonlinearity of the crystal, through the nonlinear susceptibility $\chi^{(2)}$, varies slowly with the wavelength for most nonlinear crystals away from resonance, as per Miller's rule[2]. Furthermore, the $\chi^{(2)}$ dispersion obtained from Miller's rule is partially canceled by the factor $1/[n(\omega_s)n(\omega_i)]$ in equation (1).

The laser pump (304 and 406 in FIG. 3 and FIG. 4, respectively) may be, in principle, any intense laser. Some limitations on the choice of laser arise from the sensitivity of the measuring instrument 430 to be calibrated. For common measuring instruments 430 (e.g., spectrometer or a spectrophotometer) with charge-coupled device (CCD) arrays, an intense pulsed laser may be preferred, whereas a continuous pump laser may be utilized in conjunction with more sensitive detectors, such as EMCCD cameras or sensitive optical diodes. In select embodiments, the pump laser 406 is a 355 nm wavelength laser, with 30 picosecond pulses, repetition rate 50 Hz. The energy per pulse is set to maximize the PDC brightness while remaining in the spontaneous regime. The uncalibrated spectrometer may include commercial spectrometers Ocean Optics HR4000 or Acton SpectraPro Series 25xx, with Princeton Instruments "PIXIS: 100 eXcelon" CCD camera.

The calibration protocol relies on a series of measurements. For each angle of the nonlinear crystal, corresponding to different phase-matching conditions, a certain number of spectrograms are acquired to get a reliable average number of photons. The central wavelengths of the twin peaks are then identified, and a relative calibration curve may be extracted. The main source of error is the mismatch between the phase-matching wavelengths and the wavelengths of the peaks. If a very large number of spectra are acquired, this source of error vanishes, if it is recognized that among all acquired spectra, the maximum brightness at a given wavelength has to correspond to the phase-matching condition, yielding directly the response function at that wavelength. The phase-matching wavelength may also be estimated by using the dispersion curve of the nonlinear crystal and the angle of the optic axis of the crystal; this method relies on a proper characterization of the nonlinear crystal.

The spatial profile and the frequency spectrum of the pump laser may be incorporated in the theoretical treatment. This requires a proper characterization of the pump laser's frequency spectrum and angular profile. The pump characteristics would then appear as correction factors in equations (1) and (3).

Thus, in accordance with the disclosed embodiment, the response function (i.e., the disclosed calibration) is obtained by dividing the measured spectrum with the "true" spectrum of the light source. The "true"' spectrum corresponds to curve 106 of FIG. 1b. Curve 106 corresponds to the number of photons at the phase-matched wavelengths, equation (3). In a disclosed embodiment, a large number of spectra corresponding to many phase-matching wavelengths may then be acquired (e.g., see FIG. 2). The "measured" spectrum is obtained by taking the peak value of all the spectra. In the select embodiment, the disclosed response function, or calibration, is obtained by dividing the "measured spectrum" by the curve of equation (3).

Figure 5:
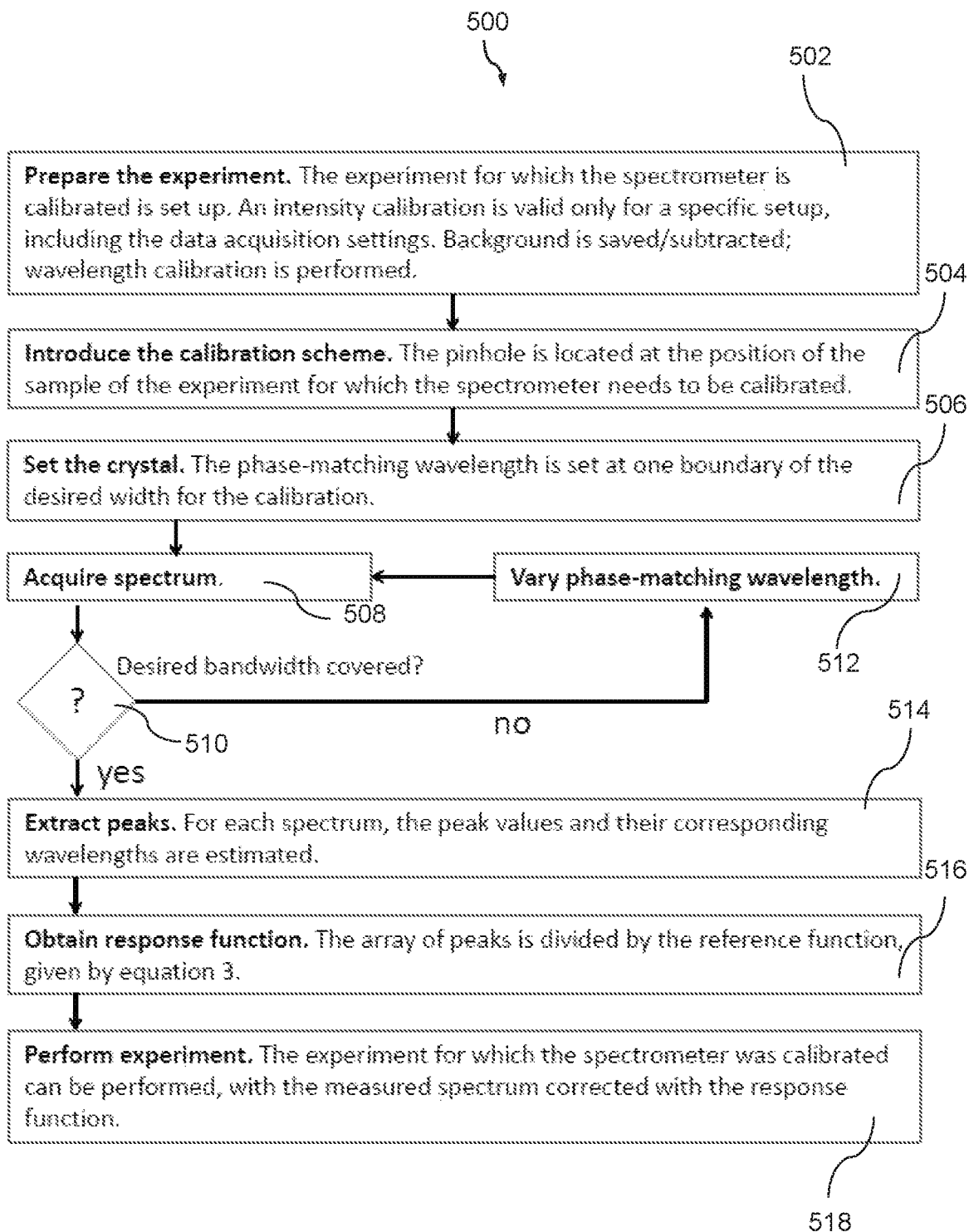
FIG. 5 is a flowchart of the methodology for obtaining the response function, according to one embodiment of the present disclosure.

FIG. 5 shows a flowchart 500 illustrating a methodology for obtaining the response function, according to one embodiment of the present disclosure. An exemplary scenario for measuring the spectrum of a light-emitting sample is presented. A spectrometer is utilized as the measuring instrument of the disclosed example.

The experiment for which the spectrometer is calibrated is set up 502. An intensity calibration is valid only for a given configuration of the spectrometer (including the all the apparatus before the spectrometer). The spectrometer and optical setup, including the acquisition settings, must be set before the calibration can be performed. The spectrometer should be calibrated in wavelength (or any other equivalent unit, such as energy or wavenumber). The background noise should be subtracted.

The intensity calibration apparatus is introduced 504. The pinhole 424 should be located at the position of the light-emitting sample that the user wants to measure i.e., the sample of the experiment for which the spectrometer needs to be calibrated.

The pump laser is sent into the nonlinear crystal and nonlinear crystal 402 is set 506 wherein the phase-matching wavelength may be set at one boundary of the desired width for the calibration.

A PDC spectrum is acquired 508 by the spectrometer. e.g., using the settings as per step 502. Disclosed embodiments determine whether a desired bandwidth is covered 510. If the determination is unfavorable, the phase-matching condition of nonlinear crystal 402 may be adjusted 512. Adjustments may be accomplished, for instance, by rotating nonlinear crystal 402, or by changing the temperature of nonlinear crystal 402. Another spectrum may be acquired 508. Step 510 may be repeated until a desired bandwidth is achieved.

The peak value and the corresponding wavelength are extracted from each spectrum 514. There is one peak on either side of the degenerate wavelength. If the spectrum is noisy, a curve-fitting algorithm (such as a Gaussian curve) may be applied. Alternatively, a convolution may be used to suppress the noise.

The disclosed methodology obtains a response function 516. The peaks extracted in step 514 are divided by the "reference value" at the phase-matched wavelength, given by equation (3). The result is the response function at that wavelength. If the number of points is sufficiently high, a linear interpolation may be used between all the points of the response function to obtain a continuous response function.

Next, the experiment for which the spectrometer was calibrated may be performed 518, with the measured spectrum corrected with the disclosed response function. The calibration apparatus is removed, and the sample to be measured is reintroduced. The true spectrum of the sample is obtained by dividing its measured spectrum with the response function obtained in step 516.

Disclosed embodiments observe that if a very large number of spectra are acquired, the need for interpolation and main source of error vanish. Disclosed embodiments recognize that among all acquired spectra, the maximum brightness at a given wavelength has to correspond to the phase-matching condition, yielding directly the response function at that wavelength.

Having described the many embodiments of the present invention in detail, it will be apparent that modifications and variations are possible without departing from the scope of the invention defined in the appended claims. Furthermore, it should be appreciated that all examples in the present disclosure, while illustrating many embodiments of the invention, are provided as non-limiting examples and are, therefore, not to be taken as limiting the various aspects so illustrated.

REFERENCES

The following references are referred to above and are incorporated herein by reference:
1. Klyshko, D. N., *Photons and Nonlinear Optics* (CRC Press) (1988).
2. Boyd, R. W., *Nonlinear optics* (Academic press) (2003).

All documents, patents, journal articles and other materials cited in the present application are incorporated herein by reference.

While the present disclosure has been disclosed with references to certain embodiments, numerous modification, alterations, and changes to the described embodiments are possible without departing from the sphere and scope of the present disclosure. Accordingly, it is intended that the present disclosure not be limited to the described embodiments, but that it has the full scope defined by the language of the following claims, and equivalents thereof.

What is claimed is:

1. An apparatus for implementing a parametric down-conversion (PDC)-based calibration comprising:
   a light source;
   a nonlinear crystal irradiated by the light source and configured to produce down-converted light comprising pairs of photons;
   an optical component in line with the nonlinear crystal for suppressing the light source and collecting the down-converted light from the nonlinear crystal;
   a collimating optical component for receiving the down-converted light from the nonlinear crystal;
   a polarizer for adjusting the polarization of the down-converted light; and
   a regulator for adjusting an angular width of the radiation of the down-converted light,
   wherein the pairs of photons in the down-converted light travel from the nonlinear crystal along a single optical pathway comprising the optical component, the collimating optical component, the polarizer, and the regulator, for measuring a ratio between a measured spectrum and an expected spectrum based on peak values and corresponding wavelengths.

2. The apparatus of claim 1, wherein the nonlinear crystal is adjustable to alter a phase-matching condition of the nonlinear crystal.

3. The apparatus of claim 2, wherein the adjustment is made by rotating the nonlinear crystal.

4. The apparatus of claim 2, wherein the adjustment is made by changing the temperature of the nonlinear crystal.

5. The apparatus of claim 1, wherein the optical component is a dichroic mirror.

6. The apparatus of claim 1, wherein the collimating optical component is a concave mirror or an achromatic lens.

7. The apparatus of claim 1, wherein the light source is a laser.

8. The apparatus of claim 1, wherein the parametric down-conversion (PDC)-based calibration is performed on a measuring instrument.

9. The apparatus of claim 8, wherein the measuring instrument is a spectrometer or a spectrophotometer.

10. A system for calibrating a measuring instrument comprising:
    a light source;
    a nonlinear crystal irradiated by the light source and configured to produce down-converted light comprising pairs of photons;
    an optical component in line with the nonlinear crystal for suppressing the light source and collecting the down-converted light from the nonlinear crystal;
    a collimating optical component for receiving the down-converted light from the nonlinear crystal;
    a polarizer for adjusting the polarization of the down-converted light;
    a regulator for adjusting an angular width of the radiation of the down-converted light; and
    an optical system for imaging the radiation from the regulator to the measuring instrument,
    wherein the pairs of photons in the down-converted light travel from the nonlinear crystal to the measuring instrument along a single optical pathway comprising the optical component, the collimating optical component, the polarizer, the regulator, and the optical system, for measuring a ratio between a measured spectrum and an expected spectrum based on peak values and corresponding wavelengths.

11. The system of claim 10, wherein the nonlinear crystal is adjustable to alter a phase-matching condition of the nonlinear crystal.

12. The system of claim 11, wherein the adjustment is made by rotating the nonlinear crystal.

13. The system of claim 11, wherein the adjustment is made by changing the temperature of the nonlinear crystal.

14. The system of claim 10, wherein the collimating optical component is a concave mirror or an achromatic lens.

15. The system of claim 10, wherein the optical component is a dichroic mirror.

16. The system of claim 10, wherein the light source is a laser.

17. The system of claim 10, wherein the measuring instrument is a spectrometer or a spectrophotometer.

18. The system of claim 10, wherein the regulator is disposed in a far field of the nonlinear crystal, by use of the collimating optical component.

19. The system of claim 18, wherein the regulator is a small aperture.

20. The system of claim 19, wherein the small aperture is a pinhole.

21. A method for implementing a parametric down-conversion (PDC)-based calibration comprising:
    calibrating a measuring instrument;
    disposing a pinhole at a position of a light-emitting sample for which the measuring instrument needs to be calibrated;
    irradiating a nonlinear crystal with a light source, the nonlinear crystal configured to produce down-converted light comprising pairs of photons that travel along a single optical pathway to the measuring instrument;
    setting the nonlinear crystal by ensuring a phase-matching wavelength of the nonlinear crystal is set at one boundary of a desired bandwidth;
    acquiring one or more PDC spectra spectrums of the down-converted light by the measuring instrument;
    obtaining peak values and their corresponding wavelengths from each acquired spectrum; and
    obtaining a response function as a ratio between a measured spectrum and an expected spectrum based on the peak values and corresponding wavelengths.

22. The method of claim 21, wherein the measuring instrument is a spectrometer or a spectrophotometer.

23. The method of claim 21, wherein the light source is a pump laser.

24. The method of claim 21, wherein setting the nonlinear crystal comprises:
    adjusting a phase-matching condition of the nonlinear crystal.

25. The method of claim 24, wherein adjusting the phase-matching condition comprises:
    rotating the nonlinear crystal.

26. The method of claim 24, wherein adjusting the phase-matching condition comprises:
    changing the temperature of the nonlinear crystal.

27. The method of claim 21, wherein background noise is subtracted when calibrating the measuring instrument.

28. The method of claim 21, wherein a curve-fitting algorithm is applied if the spectrum is noisy when peak values are obtained.

29. The method of claim 21, wherein the response function is calculated by measuring a spectrum of the light source and dividing the spectrum of the light source by a known reference output.

* * * * *